(12) United States Patent
Otteman (10) Patent No.: US 6,279,259 B1
(45) Date of Patent: *Aug. 28, 2001

(54) RIFLE SCOPE ADJUSTMENT MECHANISM (75) Inventor: Rodney H. Otteman, Aloha, OR (US)

(73) Assignee: Leupold & Stevens, Inc., Beaverton, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,691

(22) Filed: Oct. 21, 1998

Related U.S. Application Data (60) Provisional application No. 60/062,689, filed on Oct. 22, 1997.

(51) Int. Cl.[7] ....................................................... F41G 1/38
(52) U.S. Cl. ................................................. 42/122; 42/119
(58) Field of Search ........................ 33/245, 246; 350/10, 350/247

(56) References Cited

U.S. PATENT DOCUMENTS

| 2,165,796 | 7/1939 | Humeston | 33/50 |
|---|---|---|---|
| 2,229,637 | 1/1941 | Burton | 33/56 |
| 2,336,107 | 12/1943 | Litschert | 33/50 |
| 3,058,391 | * 10/1962 | Leupold | 33/246 |
| 3,222,987 | * 12/1965 | Wrigglesworth | 33/246 |
| 3,280,463 | * 10/1966 | Stadler | 33/246 |
| 3,297,389 | * 1/1967 | Gibson | 33/245 |
| 3,826,012 | 7/1974 | Pachmayr | 33/246 |
| 3,990,155 | 11/1976 | Akin, Jr. et al. | 33/247 |
| 4,038,757 | 8/1977 | Hicks et al. | 33/247 |
| 4,200,355 | 4/1980 | Wiliams, Jr. | 350/10 |
| 4,247,161 | 1/1981 | Unertl, Jr. | 350/10 |
| 5,363,559 | * 11/1994 | McCarty | 33/246 |
| 5,513,440 | 5/1996 | Murg | 33/246 |

FOREIGN PATENT DOCUMENTS

| 598306 | 2/1948 | (GB) . |
|---|---|---|
| 2213959 | 1/1989 | (GB) . |

\* cited by examiner

*Primary Examiner*—Charles T. Jordan
*Assistant Examiner*—Denise J Buckley
(74) *Attorney, Agent, or Firm*—Stoel Rives LLP (57) ABSTRACT

The invention comprises a rifle scope having an adjustment sighting mechanism, the mechanism itself, and methods of making and using the rifle scope and adjustment mechanism. The rifle scope includes an inner and an outer tube, the outer tube mounted on the rifle and the inner tube being sealed within the outer tube. The inner tube is fixed in a ball-type joint at one end, with the other end free and having positioned therein an erector lens or a reticle. An adjustment mechanism adjusts the sight of the rifle scope by displacing the second end of the inner tube. The adjustment mechanism includes a threaded adjustment plunger that is rotationally fixed with respect to the body of the scope. The adjustment plunger threads to a rotating member having a threaded portion. As the rotating member rotates, the adjustment plunger, being prevented from rotating, moves in a direction perpendicular to the axis of rotation of the rotating member. As the threaded adjustment plunger moves inward or outward with respect to the outer tube, it adjusts the position of the inner tube, which is biased against the adjustment plunger by a spring. The rotating member is rotated by a dial, having an engaged position in which rotating the dial moves the adjustment plunger and a disengaged position in which rotating the dial does not move the adjustment plunger. The disengaged position is used to reset the zero on the dial after the rifle is sighted in at a particular distance.

20 Claims, 7 Drawing Sheets

RIFLE SCOPE ADJUSTMENT MECHANISM

This application claims Benefit of Provisional Application Ser. No. 60/062,689 filed Oct. 22, 1997.

TECHNICAL FIELD

The present invention relates to the field of telescopic rifle scopes and, in particular, to such rifle scopes with adjustment mechanisms having a resettable zero.

BACKGROUND OF THE INVENTION

It is necessary to adjust a rifle scope to a target at a specific distance because a bullet falls as it travels. Thus, a bullet will hit too low on a target when the target is farther away than the distance for which the scope is adjusted, unless the sight is adjusted to compensate for the fall. Most rifle scopes allow the shooter to compensate for the fall of the bullet by adjusting the scope so that the rifle is actually aimed higher when a more distant target is viewed in the cross hairs. The degree to which a rifle is aimed above the horizon is known as elevation, and adjusting the scope to raise the shooting angle is an elevation adjustment. A similar horizontal adjustment allows compensation for a sideways movement of a bullet caused by wind and is called a windage adjustment.

A shooter typically adjusts the elevation of the scope by turning a dial mounted on the scope body. The dial typically is marked with a scale around its diameter, and the body of the scope has an index mark marked on it. The shooter typically adjusts the scope so that a bullet will hit a target at a particular distance, e.g., 100 yards, when the target is in the cross hairs of the reticle. When the shooter wants to shoot at a target that is 200 yards away, he or she rotates the dial a predetermined angular distance so that the cross hairs will be accurately placed for a target at 200 yards. Many scopes use various types of click mechanisms to provide an audible or tactile indication for every increment of rotation. The shooter then does not need to take his or her eye from the target to adjust the elevation. Some scopes also provide a mechanism for adjusting the scale on the dial so that the shooter can align the zero mark of the scale with the index mark on the outer tube when the rifle is sighted in at a reference distance. The shooter can then easily return to the reference sighting or see how much he has adjusted the sight.

Rifle scopes are typically constructed of two tubes: an inner tube and an outer tube. The outer tube is fixed substantially parallel to the rifle barrel. The inner tube is typically fixed at one point to the inside of the outer tube by a ball-type joint, with the free end of the inner tube being movable in both the horizontal and vertical directions. A reticle or an erector lens assembly, or both, can be mounted at the movable end of the inner tube. The movable end can be adjusted up or down to adjust the elevation and horizontally to adjust for windage. Scope designs of this type are described in U.S. Pat. Nos. 3, 297, 389 and 4,408,842 of Gibson.

Many mechanisms have been used or proposed over the years to move the inner tube of rifle scopes to adjust the elevation and adjust for windage. Many such mechanisms use adjusting screws threaded into the outer tube that bear against the inner tube. As the shooter rotates the adjusting screw, it moves further inside the outer tube, pushing the inner tube. A spring located between the inner tube and the outer tube wall opposite the threaded adjusting screws biases the inner tube against the adjusting screws so that when the adjusting screws are rotated so as to move in an outward direction, the inner tube will follow the adjusting screw. The adjusting mechanism may be sealed to the outer tube to maintain within the interior of the outer tube a nitrogen gas charge necessary to prevent fogging and condensation on internal lens surfaces.

In these prior art designs, the rotating adjustment screws bear directly on the inner tube. Any out-of-roundness of the bearing end of the adjustment screw will cause changes to the sighting as the adjustment screw moves. As the windage and elevation adjustments change, the point of contact on the bearing end of the adjustment screw changes. Any deviation of the shape of the outer diameter of the inner tube from that of a perfect cylinder will cause deviations in the adjustment as the adjustment screws push against different points on the inner tube. Moreover, the contact of the adjustment screw end with the inner tube can cause wear on both parts. Wear can make the adjustment less even and can generate small particles that affect the optics and the adjustment mechanism.

SUMMARY OF THE INVENTION

An object of the invention is to provide a mechanism for adjusting a rifle scope for elevation and windage.

Another object of the invention is to provide such an adjustment mechanism with a smooth adjustment.

A further object of the invention is to provide such a mechanism having a resettable zero and a tactile adjustment indicator.

Yet another object of the invention is to provide such a mechanism having parts that can be replaced to change the characteristics of the adjustment without unsealing the outer tube.

These and other objects of the invention are accomplished by a rifle scope having an sighting adjustment mechanism, the adjustment mechanism itself, and methods of making and using the rifle scope and adjustment mechanism. The rifle scope includes an inner and an outer tube, the outer tube mounted on the rifle and the inner tube being sealed within the outer tube. The inner tube is fixed in a ball-type joint at one end, with the other end free. The adjustment mechanism adjusts the sight of the rifle scope by displacing the free end of the inner tube. The adjustment mechanism includes a threaded adjustment plunger that is rotationally fixed with respect to the body of the scope. The adjustment plunger threads onto a rotating member that is rotatably mounted to the body of the scope and includes a threaded portion. The rotating member is preferably an adjustment nut having a threaded internal bore. Alternatively, the rotating member includes male threads that mate with female threads on the adjustment plunger. As the rotating member rotates, the adjustment plunger, being prevented from rotating, moves in a direction perpendicular to the axis of rotation of the rotating member. As the threaded adjustment plunger moves inward or outward with respect to the outer tube, it adjusts the position of the inner tube.

The rotating member is rotated by a dial having an engaged position in which rotating the dial moves the adjustment plunger and a disengaged position in which rotating the dial does not move the adjustment plunger. The disengaged position is used to reset the zero on the dial after the rifle is sighted in at a particular distance.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
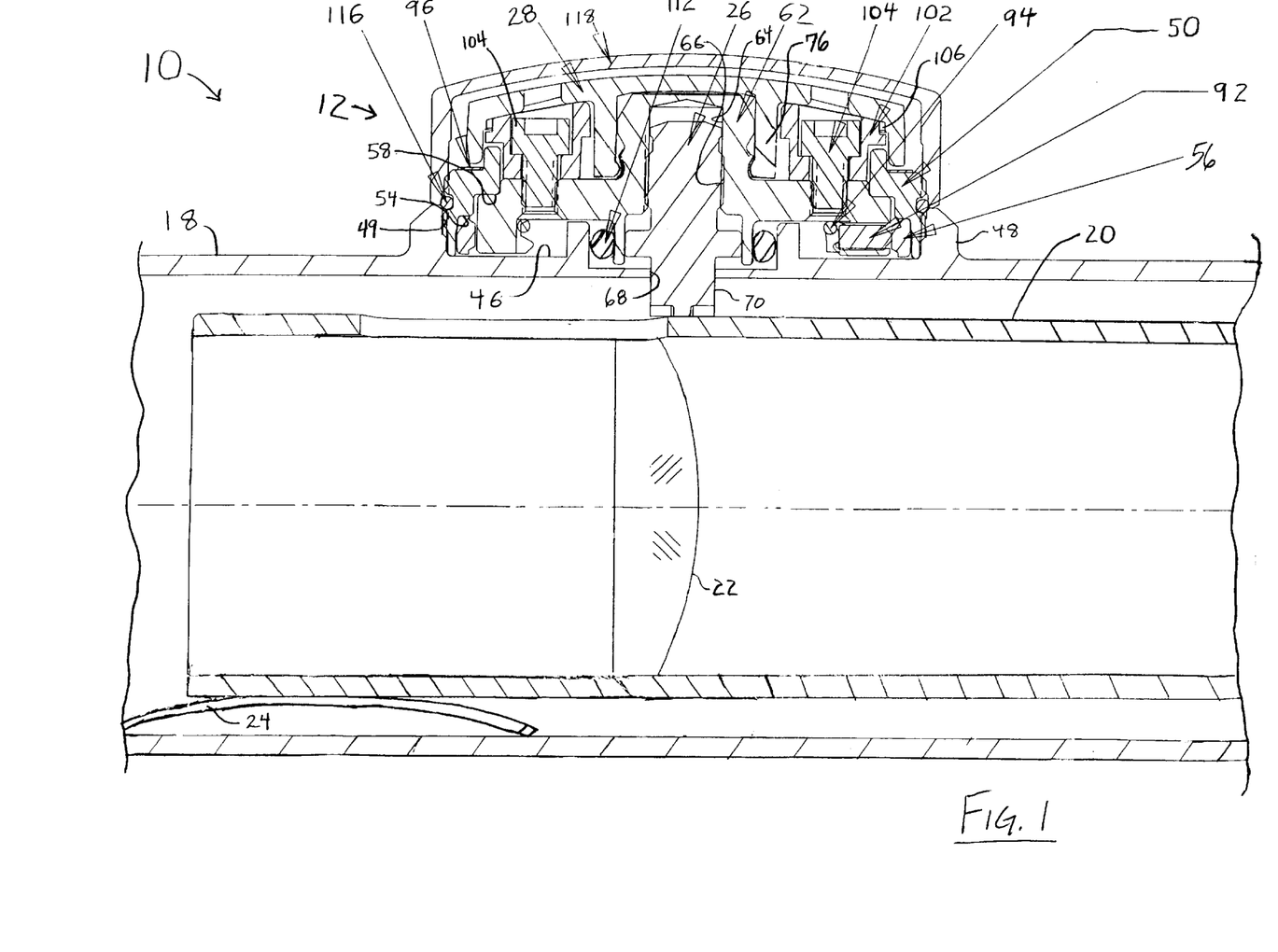
FIG. 1 is a partial cross sectional view of the of the rifle scope of the present invention.
Figure 2:
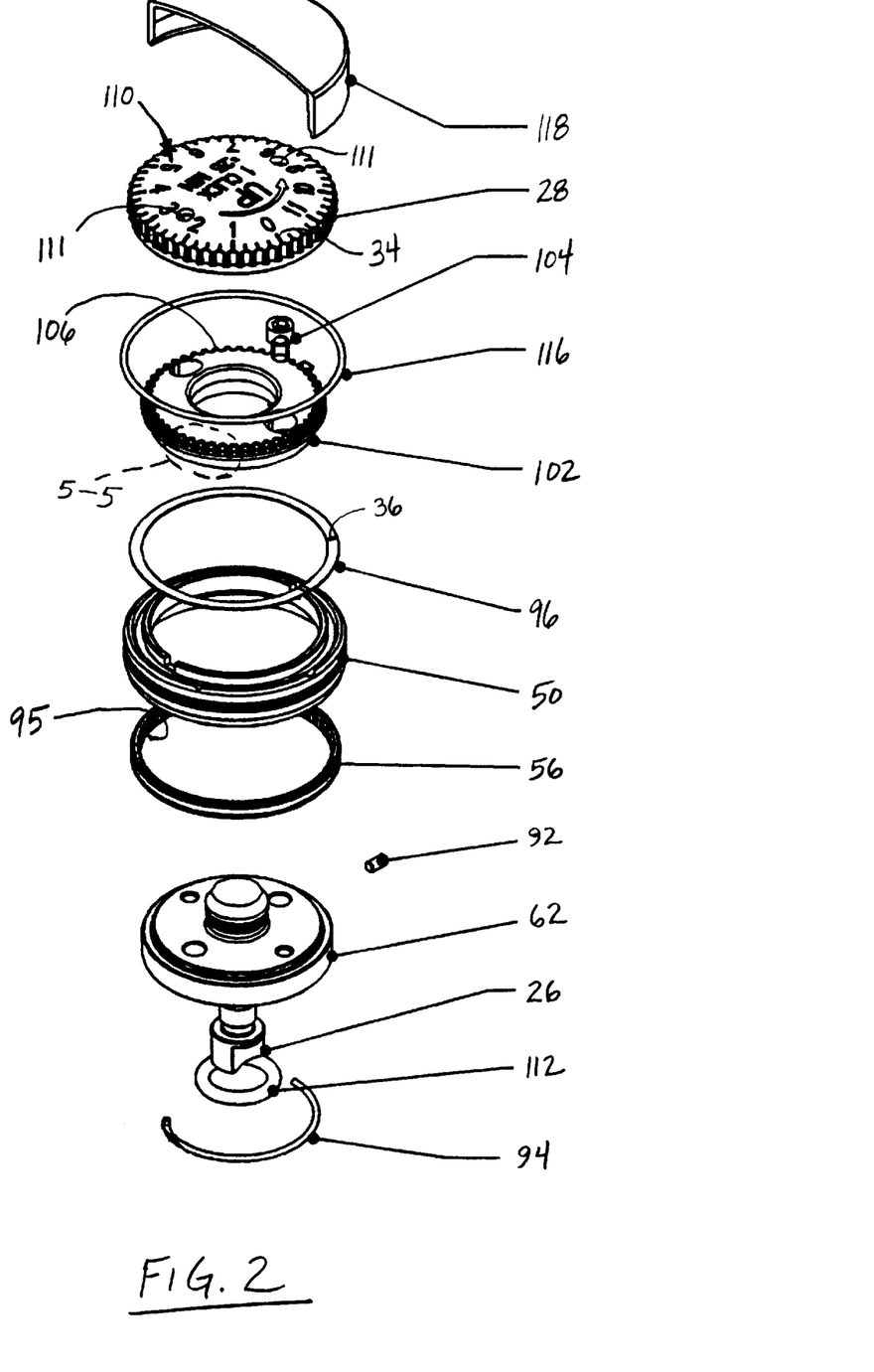
FIG. 2 is an exploded perspective view of the adjustment mechanism of the rifle scope of FIG. 1 with the cap of the adjustment mechanism shown in a sectional perspective view.
Figure 3:
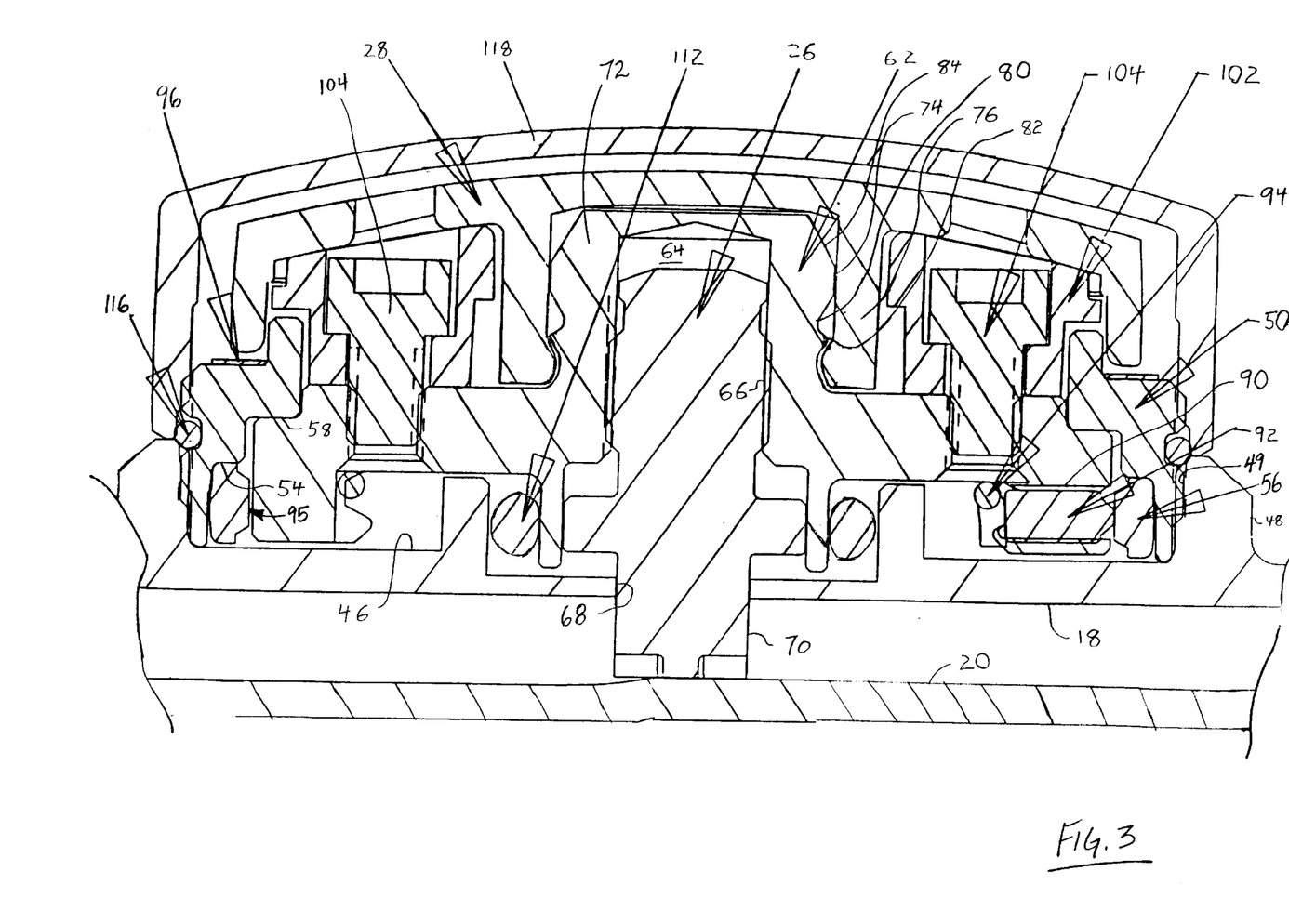
FIG. 3 is an enlarged cross sectional view of the rifle scope adjustment mechanism of the rifle scope of FIG. 1.

FIGS. 1–3 show a preferred embodiment of a rifle scope 10 and an adjustment mechanism 12 of the present invention. The description below describes a single adjustment mechanism although it is understood that a rifle scope may include two adjustment mechanisms: a horizontal adjustment mechanism for windage adjustment and a vertical adjustment mechanism for elevation adjustment.

With reference to FIGS. 1–3, rifle scope 10 includes an outer tube 18 that is mounted to a rifle stock (not shown) and an inner tube 20 positioned within outer tube 18. There are many known designs for inner tube 20 and outer tube 18 and for the optics or reticle therein. Positioned within inner tube 20 is an erector lens assembly 22 and/or a reticle (not shown). Inner tube 20 is pivotally mounted at one end to outer tube 18 with a ball-type joint (not shown) so that inner tube 20 can pivot horizontally and vertically about the joint. Near its distal end 23, inner tube 20 is positioned between a biasing spring 24 and a threaded adjustment plunger 26, so that inner tube 20 follows the in-and-out movement of adjustment plunger 26. Rifle scope 10 includes a rotatable dial 28 having two positions along its axis of rotation: an engaged position and a disengaged position. In the engaged position, as shown in FIGS. 1 and 3, rotation of dial 28 causes adjustment plunger 26 to move along the axis of rotation of dial 28, thereby displacing inner tube 20.

A shooter will typically shoot at a reference target at a known distance and rotate dial 28 in the engaged position until a bullet hits the target when the cross hairs are centered on the target. The shooter will then pull dial 28 to the disengaged position and rotate dial 28 until a zero mark 34 (FIG. 2) on dial 28 is aligned with a reference mark 36 that is fixed in relation to the outer tube 18. Dial 28 is then pushed by the shooter back into the engaged position to "zero" adjustment mechanism 12. When subsequently shooting at a target, the shooter estimates the distance to the target and rotates dial 28 an appropriate amount to compensate for the difference in distance between the target and the reference target.

Adjustment mechanism 12 is supported within a counterbore 46 formed in a boss 48 on outer tube 18. An interior vertical wall 49 of counterbore 46 is threaded and receives a threaded flange 50 having a first shoulder 54 that holds a click ring 56 against outer tube 18, and a second shoulder 58 that loosely traps a rotating member, preferably a rotatable adjustment nut 62, between flange 50 and outer tube 18. Adjustment nut 62 has a blind bore 64 that is threaded along its inner diameter 66 to receive adjustment plunger 26. A rectangular hole 68 in outer tube 18 is positioned at the center of counterbore 46 and sized to receive a keyed end 70 of adjustment plunger 26 to prevent adjustment plunger 26 from rotating. A hub 72 (FIG. 3) of adjustment nut 62 is of irregular cross section, having a large diameter ridge 74 for retaining spring elements 76 of dial 28, a groove portion 80 for seating spring elements 76 when dial 28 is in the disengaged position, and a ridge 82 for demarking a boundary between the engaged and disengaged position of dial 28. A chamfer 84 is provided at the distal end of hub 72 to facilitate the assembly of dial 28 onto adjustment nut 62.

Adjustment nut 62 includes an radially oriented bore 90 (FIG. 3) for holding a click plunger 92. A spring 94 biases click plunger 92 against an inner surface 95 of click ring 56. Inner surface 95 of click ring 56 is corrugated to prevent inadvertent rotation of adjustment nut 62 and to provide audible and tactile clicks when the shooter rotates adjustment nut 62. An indicator ring 96 having thereon a fiducial or reference mark 36 mounts above flange 50. A dial retainer 102 is fixed to adjusting nut 62 by two screws 104.

Figure 4:
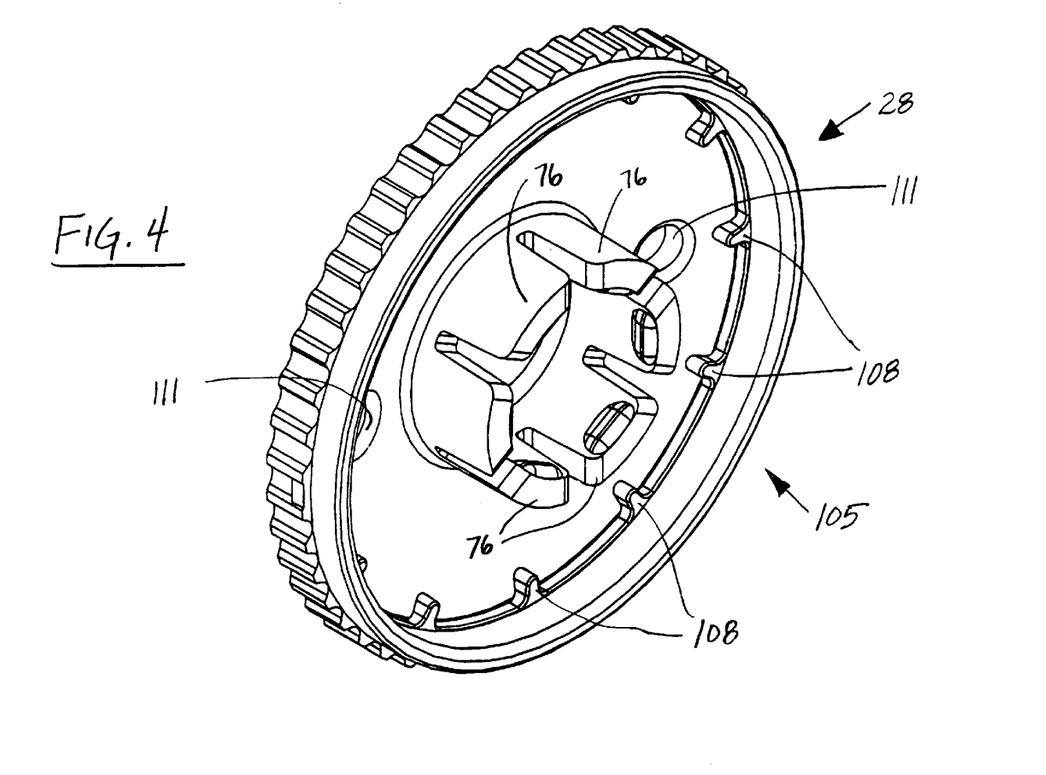
FIG. 4 is an enlarged bottom perspective view of the dial of the rifle scope adjustment mechanism of FIG. 2 showing ridges formed in the underside of the dial.
Figure 5:
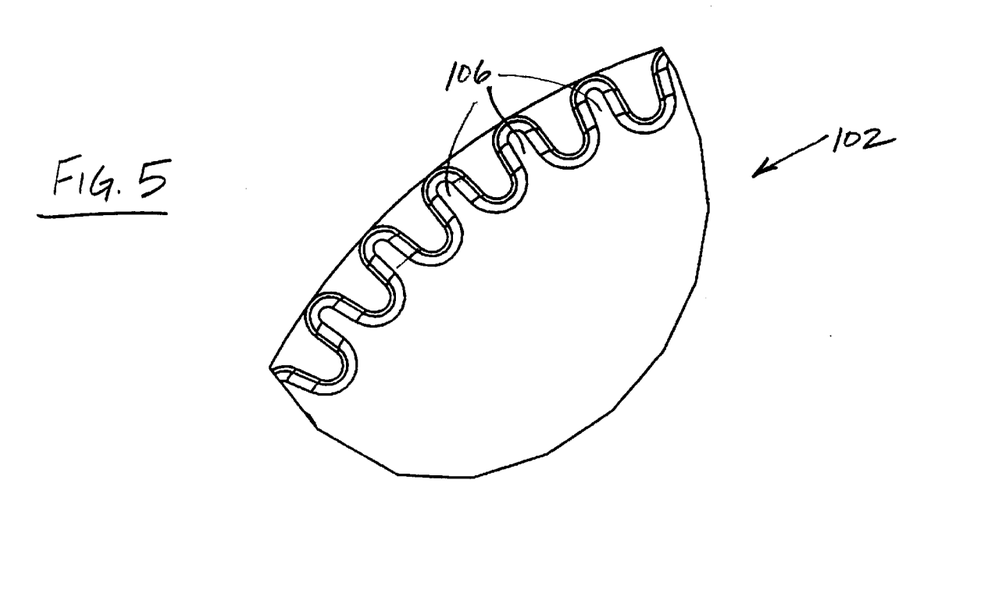
FIG. 5 is an enlarged top detail view of the circled area 5—5 of FIG. 2 showing detail of the dial retainer of the rifle scope adjustment mechanism.

FIG. 4 is an enlarged bottom perspective view of dial 28 of rifle scope adjustment mechanism 12 showing an underside 105 of dial 28. FIG. 5 is an enlarged top detail view of circled area 5—5 of FIG. 2 showing a plurality of serrations 106 that form the top outer margin of dial retainer 102. With reference to FIGS. 4 and 5 a plurality of ridges 108 on the underside 105 of dial 28 mate with serrations 106 when dial 28 is in the engaged position. In a preferred embodiment, dial retainer 102 includes forty-eight or ninety-six serrations 106 and dial 28 includes eight ridges 108. Having fewer ridges 108 than serrations 106 reduces the required manufacturing tolerances of the meshing parts. A larger number of serrations 106 allows more accurate zeroing of adjustment mechanism 12, but may require larger parts or increase manufacturing costs.

Dial 28 includes six spring elements 76 arranged in a circle for attaching dial 28 to hub 72 of adjustment nut 62. Dial 28 has a scale 110 marked on its top (FIG. 2) and holes 111 that provide access to screws 104. Dial 28 can be removed and replaced with a dial having a different scale for use with different weapons or different ammunition. Dial 28 is removed by pulling dial 28 axially, causing spring elements 76 to spread and move over large diameter ridge 74. Dial retainer 102 can also be easily removed and replaced, so that different dial retainers 102 having different numbers of serrations 106 can be interchanged. In the preferred embodiment, dial 28 and dial retainer 102 can be removed and replaced without breaking the gas tight seal of rifle scope 10. It is therefore not necessary to purge rifle scope 10 of air using dry nitrogen whenever it is desirable to change dial 28 or dial retainer 102. This allows rifle scope 10 to be customized late in the manufacturing process or in the field.

The preferred embodiment also includes an adjustment plunger O-ring 112 that seals the opening in outer tube 18 through which adjustment plunger 26 is inserted and a flange O-ring 116 that allows the adjustment mechanism 12 to be protected with a cap 118 that seals against flange O-ring 116 to keep out contamination.

Figure 6A:
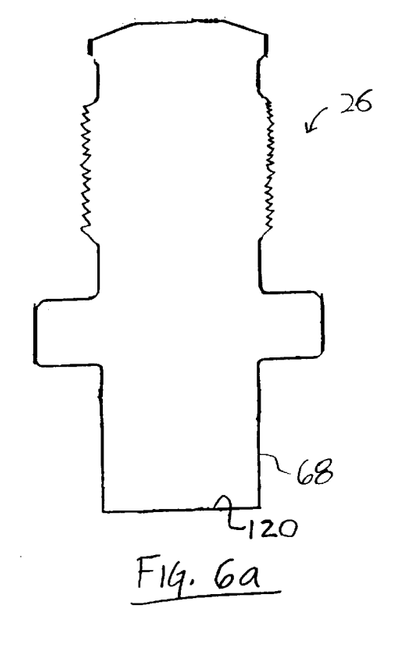
FIGS. 6a, 6b, and 6c are respective left and right elevation views and a bottom view of the adjustment plunger of the rifle scope adjustment mechanism of FIG. 1.
Figure 6B:
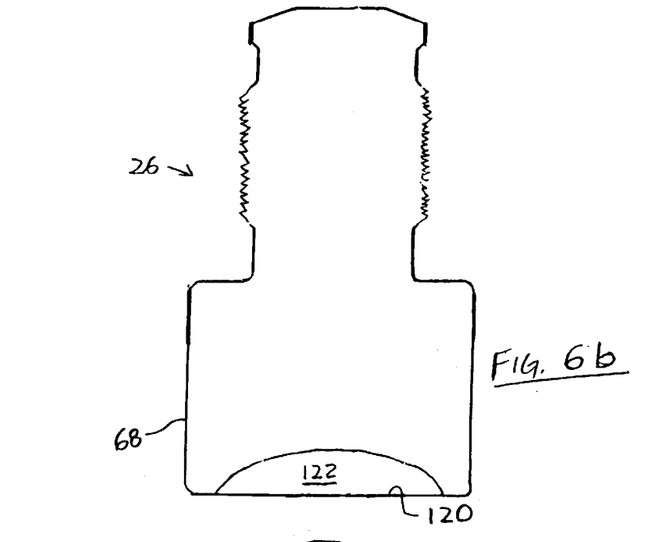
Figure 6C:
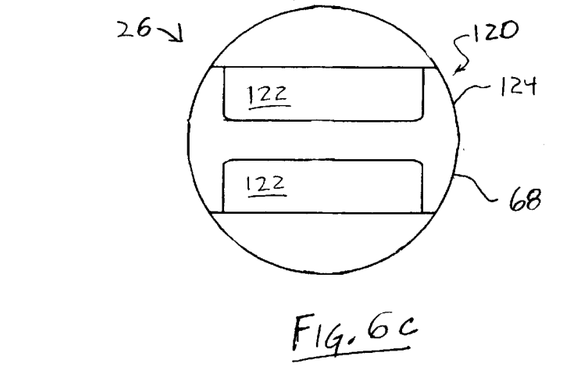

FIGS. 6a, 6b, and 6c are respective left and right elevation views and a bottom view showing detail of adjustment plunger 26. With reference to FIGS. 6a, 6b, and 6c, adjustment plunger 26 has a bottom face 120 relieved by two arcuate cuts 122 to provide an I-shaped surface 124 that bears on inner tube 20. I-shaped surface 124 provides a smooth contact to inner tube 20, even as inner tube 20 is shifted off axis by adjustment of a second perpendicular adjustment mechanism.

Figure 7:
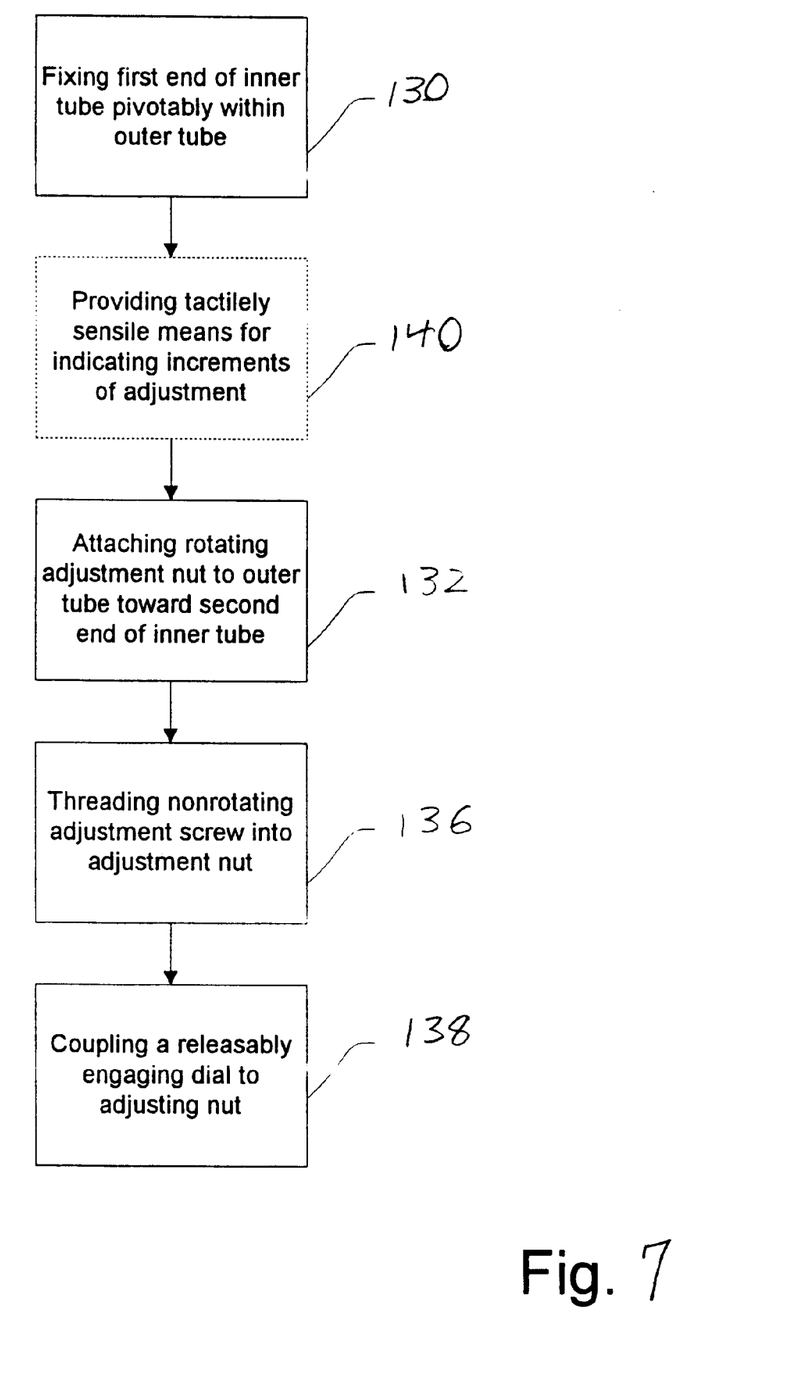
FIG. 7 is a flow chart showing a method of manufacturing a rifle scope.

FIG. 7 is a flow chart illustrating a method of making a rifle scope having a resettable zero. Step 130 includes fixing a first end of an inner tube within an outer tube in a manner to prevent displacement and to allow pivoting. Step 132 includes attaching a rotatable adjusting nut having a threaded internal bore to the outer tube toward a second end of the inner tube. Step 136 includes threading a nonrotatable adjustment plunger into the threaded internal bore of the rotatable member so that a rotation of the adjusting nut causes an axial displacement of the nonrotatable adjustment plunger and of the inner tube. Step 138 includes coupling a releasably engaging dial to the adjusting nut so that turning the dial when it is engaged with the rotating member causes the nonrotating adjustment plunger to displace along its axis and so that turning the dial when it is not engaged does not cause the adjusting nut to rotate. Optionally, step 140 includes providing a tactile device for indicating the amount of rotation by the dial and to maintain the adjusting nut in a position once set.

Figure 8:
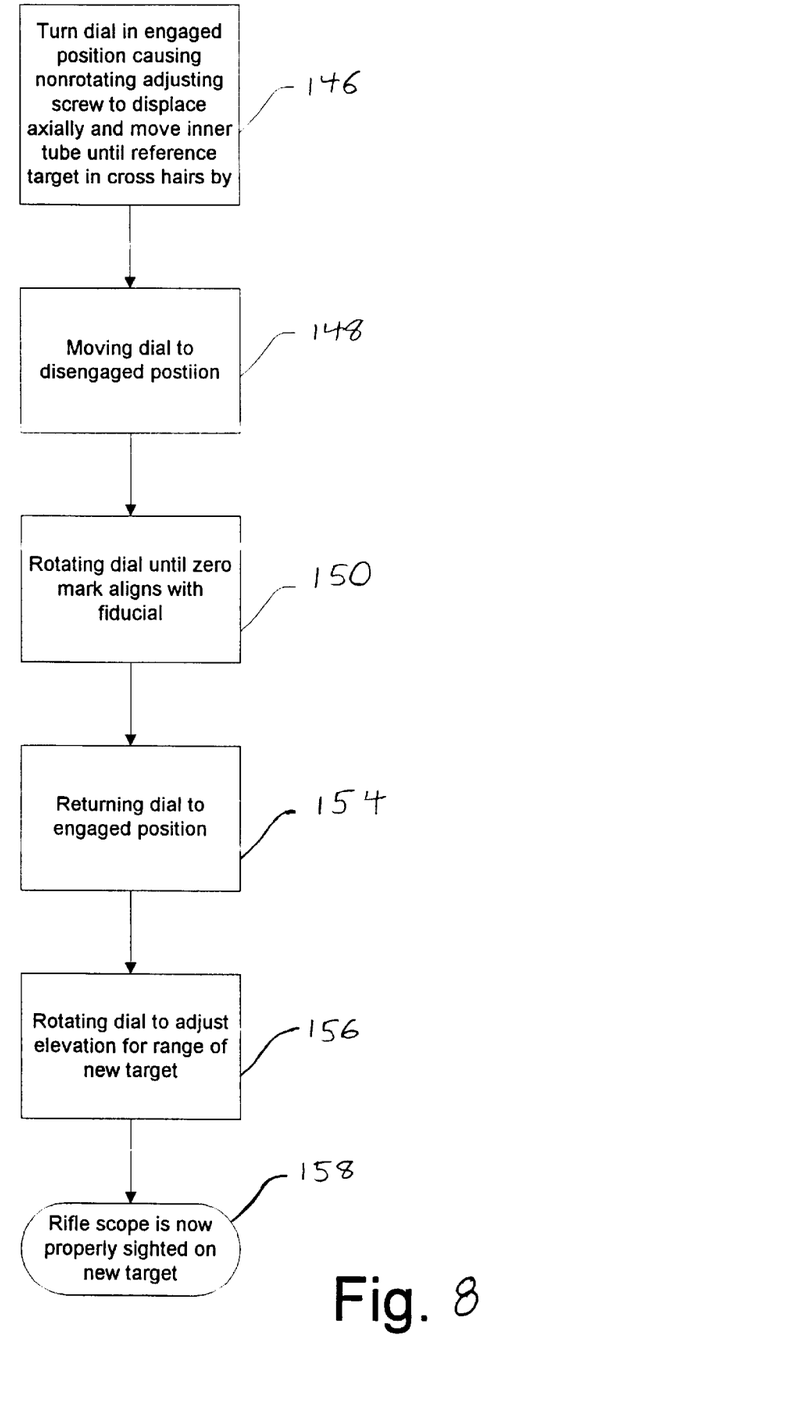
FIG. 8 is a flow chart showing a method of adjusting a rifle scope.

FIG. 8 is a flow chart showing a method of adjusting the sighting of a rifle scope. Step 146 shows that a shooter adjusts a rifle sight until the cross hairs indicate a target at a first range by rotating a dial that is releasably engaged with an adjustment nut having a nonrotating adjustment plunger threaded therein to cause the nonrotating adjustment plunger to displace axially and adjust the displacement of one end of an inner tube until a fired bullet hits the target seen in the cross hairs. Step 148 indicated that the shooter moves the dial to the disengaged position. In step 150, the shooter rotates the dial until a zero mark indicated thereon coincides with a mark fixed with respect to the outer tube, and then in step 154, the shooter returns the dial to the engaged position. When the shooter identifies a target and estimates its range, the shooter rotates the dial in step 156 so that the zero position rotates away from the fixed mark in an amount appropriate to the range of a new target. Terminal block 158 indicates that the rifle scope is now sighted in on the new target.

It will be obvious that many changes may be made to the above-described details of the invention without departing from the underlying principles thereof. From the knowledge disclosed in the present application, one skilled in the art would perceive other mechanical arrangements that differ from the preferred embodiment described above and still accomplish the objects of the invention. For example, rather than the erector lens being placed at the displaceable end of inner tube 20, a reticle could be placed at that end. Other mechanisms could be designed to removably engage dial 28 and adjustment nut 62. The scope of the present invention should, therefore, be determined only by the following claims.

What is claimed is:

1. A sight adjustment mechanism for a rifle scope, the rifle scope having an inner tube and an outer tube, the outer tube having an interior, the inner tube having first and second ends and positioned within the interior of the outer tube, the outer tube being fixed with respect to the rifle barrel, and the inner tube being adjustable within the outer tube, the adjustment mechanism comprising:

a rotating member having an axis of rotation and a threaded portion centered on the axis of rotation, the rotating member adapted for mounting to the outer tube such that, when rotated, the rotating member remains stationary along its axis of rotation relative to the outer tube;

a nonrotating threaded adjustment plunger threaded onto the threaded portion of the rotating member and extending within the outer tube toward the inner tube, rotation of the rotating member causing the adjustment plunger to move along the axis of rotation of the rotating member and to displace the inner tube; and a dial movable between an engaged position and a disengaged position such that rotation of the dial when in the engaged position causes the rotating member to rotate and such that, when in the disengaged position, the dial is rotatable relative to the rotating member.

2. The mechanism of claim 1 in which the outer tube includes an opening through which the adjustment mechanism extends and further comprising:

a gas impermeable seal surrounding the opening of the outer tube and positioned between the outer tube and one of the rotating member and the adjustment plunger to seal the interior of the outer tube.

3. The mechanism of claim 1 in which:

the rotating member includes first surface contours; and the dial includes second surface contours positioned adjacent the first surface contours for releasable engagement with the first surface contours when the dial is in the engaged position so that rotation of the dial causes rotational force to be transferred to the rotating member.

4. The mechanism of claim 3 in which the rotating member comprises two parts, a first part that includes the threaded portion and a second part that includes the first surface contours, the second part mounted on the first part so that the second part may be removed from the rifle scope independently of the first part.

5. The mechanism of claim 1 in which the rotating member includes a hub and the dial includes spring elements surrounding the hub to maintain the dial on the hub.

6. The mechanism of claim 5 in which the hub includes diameter variations across which the spring elements traverse when the dial is moved between the engaged and disengaged positions to prevent inadvertent disengagement of the dial.

7. The mechanism of claim 1 further comprising a tactile indicator allowing a shooter to tactilely determine the extent of an adjustment without averting his eye from a target viewed through the rifle scope.

8. The mechanism of claim 7 in which the tactile indicator comprises:

a surface having regularly spaced features;

a click plunger engaging with the regularly spaced features, one of the surface and the click plunger being fixed in relation to the rifle scope and the other of the surface and the click plunger being rotatable along with the rotating member; and a means for biasing the click plunger against the regularly spaced features.

9. The mechanism of claim 8 in which the regularly spaced features are corrugations, and the biasing means is a spring.

10. The mechanism of claim 1 in which the inner tube is pivotally mounted at its first end to the outer tube so that the second end of the inner tube is pivotally displaceable by the adjustment mechanism.

11. The mechanism of claim 10, further comprising a spring positioned within the outer tube to bias the second end of the inner tube toward the adjustment plunger.

12. The mechanism of claim 10 in which a reticle is placed near the second end.

13. The mechanism of claim 10 in which an erector lens is placed near the first end.

14. A rifle scope, comprising:

an outer tube adapted to be mounted onto the rifle;

an inner tube positioned within the outer tube and having a first end and a second end, the first end pivotally mounted within the outer tube and the second end being displaceable; and an adjustment mechanism including:

an flange fixed to the outer tube;

a rotatable member having an axis of rotation and a threaded portion centered on the axis of rotation, the rotatable member being rotatable in relation to the flange such that, when rotated, the rotating member remains stationary along its axis of rotation relative to the outer tube;

a nonrotating threaded adjustment plunger threaded onto the threaded portion of the rotating member and extending within the outer tube toward the inner tube, rotation of the rotating member causing the adjustment plunger to move along the axis of rotation of the rotating member and to displace the inner tube; and a dial releasably coupled to the rotating member and movable between an engaged position and a disengaged position such that rotation of the dial when in the engaged position causes the rotating member to rotate and such that, when in the disengaged position, the dial is rotatable relative to the rotating member.

15. The rifle scope of claim 14 in which the outer tube includes an opening through which the adjustment mechanism extends and further comprising:

a gas impermeable seal surrounding the opening of the outer tube and positioned between the outer tube and one of the rotating member and the adjustment plunger to seal the interior of the outer tube.

16. The rifle scope of claim 14 further comprising a tactile positioner and rotation indicator having two parts, a first part mounted on the rotating member and a second part fixed in relation to the rifle scope, one of the first and second parts biased against the other of the first and second parts to provide a tactilely sensible feedback as the adjustment mechanism is adjusted and to prevent inadvertent adjustment of the adjustment mechanism.

17. The rifle scope of claim 14 in which:

the dial includes at least one spring element; and the rotatable member includes a hub having an outer surface of varying outer diameter positioned to engage the spring element of the dial.

18. The rifle scope of claim 16 in which the varying outer diameter of the hub defines first and second positions of engagement of the spring element of the dial so that the dial is coupled to the rotating member when the spring element is engaged in the first position and the dial is uncoupled from the rotating plate when the spring element is engaged in the second position.

19. The mechanism of claim 14 in which:

the rotating member includes one or more surface features; and the dial includes one or more surface features adjacent the surface features of the rotating member for releasable engagement with at least one the surface features of the rotating member when the dial is in the engaged position so that rotation of the dial causes rotational force to be transferred to the rotating member.

20. The mechanism of claim 19 in which the rotating member comprises two parts, a first part that includes the threaded portion and a second part that includes the first surface features, the second part mounted on the first part so that the second part may be replaced without unsealing the outer tube.

\* \* \* \* \*

UNITED STATES PATENT AND TRADEMARK OFFICE
CERTIFICATE OF CORRECTION

PATENT NO.     : 6,279,259 B1
DATED          : August 28, 2001
INVENTOR(S)    : Rodney H. Otteman It is certified that error appears in the above-identified patent and that said Letters Patent is hereby corrected as shown below:

Drawings,
Replace shown drawings, FIGS. 1-8 (7 drawing sheets), with formal drawings, FIGS. 1-8 (6 drawing sheets).

Signed and Sealed this

Sixth Day of January, 2004

JAMES E. ROGAN
*Director of the United States Patent and Trademark Office*